United States Patent [19]

Gagliardi et al.

[11] 4,263,136

[45] Apr. 21, 1981

[54] PROCESS FOR DEODORIZING AQUEOUS EFFLUENT DERIVED FROM THE MANUFACTURE OF ORGANIC CHEMICALS

[76] Inventors: George N. Gagliardi, 16 Vanderveer Dr.; Stephen D. Levy, 4 Tower Pl., both of Lawrenceville, N.J. 08648

[21] Appl. No.: 30,677

[22] Filed: Apr. 16, 1979

[51] Int. Cl.$^3$ .............................................. C02F 1/72
[52] U.S. Cl. ................................................... 210/759
[58] Field of Search ..................... 210/63 R, 59, 63 Z, 210/DIG. 29

[56] References Cited

U.S. PATENT DOCUMENTS

| 2,795,544 | 6/1957 | Williams et al. | 210/63 Z |
| 3,705,098 | 12/1972 | Shepherd et al. | 210/63 R |
| 3,867,509 | 2/1975 | Geiger et al. | 210/63 R |
| 4,160,656 | 7/1979 | Junkermann | 210/63 R |

*Primary Examiner*—Thomas G. Wyse

[57] ABSTRACT

A process for the deodorizing and removing organic materials from sulfur containing aqueous effluent obtained in the manufacture of organic chemicals by treatment of said effluent with hydrogen peroxide under controlled conditions.

4 Claims, No Drawings

PROCESS FOR DEODORIZING AQUEOUS EFFLUENT DERIVED FROM THE MANUFACTURE OF ORGANIC CHEMICALS

SUMMARY OF THE INVENTION

This invention relates to a process for the treatment of malodorous aqueous effluent derived from the manufacture of sulfur-containing organic chemicals, particularly organothiophosphates, organodithiophosphates, thiocarbamates, dithiocarbamates and the like.

Untreated aqueous effluents of this type are generally toxic to bacteria used for conventional biotreatments of such waste and the organic oils present in such untreated effluents cause excessive loading of the relatively expensive carbon treatment frequently employed in treatment of said effluents. The present process is directed to the elimination of these problems in the handling of the effluents described.

In accordance with the invention, aqueous effluent or waste containing water soluble sulfurous by products, water soluble organic by-products and/or unreacted water soluble starting materials, is charged to a reaction vessel, the pH of the aqueous effluent is adjusted to about 1.0 to 4.0 and preferably to approximately pH 2. This adjustment is generally made by the addition of a strong mineral acid, such as sulfuric acid or hydrochloric acid, to the aqueous effluent. The mixture is then heated to a temperature between about 20° C. and 85° C. and preferably to about 75° C. to 85° C. Hydrogen peroxide is added to the heated mixture, usually over an extended time period of from about 30 to 60 minutes. However, depending on the particular effluent being treated, treatment time may be extended to several hours or more and sufficient hydrogen peroxide is added to give a positive response to a starch-potassium iodide paper. During the hydrogen peroxide addition, it is generally necessary to add additional mineral acid to maintain the pH of the heated solution at about 1.0 and 4.0 and preferably about pH 2.

Surprisingly, we have found that this treatment has the advantage that it not only eliminates the undesirable odor from the aqueous waste, but also causes water soluble organic by-products and water soluble unreacted starting materials to oil out or precipitate as organic oils. The organic phase (i.e. the precipitated oil) is then separated from the aqueous phase and incinerated. The aqueous phase is then ready for pH adjustment, biological treatment, carbon treatment and disposal to a natural waterway.

In practice, we have found it particularly desirable to heat the peroxide treatment effluent, which has been acidified to (pH=1 to pH=4), to a temperature between 75° C. and 85° C., but not exceeding about 85° C. At higher temperatures instability problems can occur. At temperatures below about 75° C., it has been found that colloidal sulfur can be formed in the effluent during treatment. When this occurs, the treated effluent must be allowed to stand until sufficient agglomeration of the sulfur occurs to permit easy separation thereof from the treated solution. Temperatures between about 75° C. and 85° C. apparently inhibit formation of colloidal sulfur in the treated effluent or cause rapid agglomeration of the colloidal sulfur if it is formed. Temperatures between 75° C. and 85° C. are thus preferred.

We have also found that hydrogen peroxide having a concentration between about 10% and 70%, and preferably between 30% and 50%, is useful in the practice of the present invention. Concentrations of hydrogen peroxide above about 70% or below about 10% are not preferred for use in the invention since more cncentrated solutions of hydrogen peroxide must be handled with extreme care and less concentrated solutions are impractical because of the shipping and handling of the large volume of water associated with the low percent hydrogen peroxide.

While aqueous effluent from the manufacture of a variety of organothiophosphates, organodithiophosphates, thiocarbamates, and dithiocarbamates may be treated in accordance with the present invention, we have found the process of this invention to be especially useful in the treatment of aqueous waste derived in the manufacture of malathion, i.e. S-(1,2-dicarbethoxyethyl)0,0-dimethyl phosphorodithioate.

Malathion is a very well-known pesticide, which is highly effective for the control of a wide variety of insect pests and exhibits a very low level of mammalian toxicity. It can be prepared by reacting 0,0-dimethyl phosphorodithioic acid with diethyl maleate as described in U.S. Pat. No. 2,578,652 issued Dec. 18, 1951. The reaction generally involves condensation of the above-named phosphorodithioic acid with diethyl maleate at a temperature between about 79° C. and 88° C. in the presence of a solvent. Following the reaction, the solvent is stripped under vacuum and the crude product, i.e. malathion, washed with caustic soda or sodium carbonate solution and water. The crude malathion is then stripped of water under vacuum, cooled and filtered. The wash water from the above reaction contains small, but objectionable, amount of malodorous and/or noxious sulfur containing by products, water soluble organic by-products and/or unreacted water soluble starting materials. As such, this aqueous effluent, with its objectionable odor and undesirable by products and starting materials could not be disposed of by simply pumping it to natural waterways.

Typically effluent of this type is disposed of by barging to sea, filing of deep wells, dumping at disposal sites, incinerating, treating with carbon, etc. The first three create extremely serious environmental problems. Incineration of essentially aqueous effluent streams is extremely wasteful of our limited energy supplies and very expensive. Use of carbon is also expensive. Today mankind has begun to appreciate the importance of the environment to our continued existence, especially in the areas of food supply, recreation, transportation and mining, and has begun to enact new codes of practice which will make it unlawful to dispose of objectionable materials without consideration for the impact of such act on the environment.

It is, therefore, an object of this invention to provide a novel method of treating malodorous aqueous wastes which contain objectionable noxious sulfurous materials, water soluble organic by-products and/or water soluble starting materials derived from organic reactions, such as in the preparation of pesticides, to eliminate the objectionable odors from said wastes and remove the noxious materials therefrom.

It is another object of this invention to provide a novel process for the treatment of aqueous wastes from the manufacture of organothiophosphates, dithiophosphates, thiocarbamates or dithiocarbamates, to render said aqueous wastes substantially free of objectionable odor and noxious chemicals.

The invention is further illustrated in conjunction with the following examples which are provided only by way of illustration and are not intended as limitations on said invention.

EXAMPLE 1

Deodorization of aqueous effluent, obtained in the manufacture of S-(1,2-dicarbethoxyethyl)0,0-dimethyl phosphorodithioate, i.e. malathion, and removal of water soluble noxious by-products and starting materials from said effluent is demonstrated by the following test. In this test, 3.5 liters of aqueous effluent, obtained in the manufacture of malathion, is charged to a five liter vessel and acidified to pH 2 with concentrated sulfuric acid. The acidified solution is then treated with 175 ml of 30% hydrogen peroxide and heated to a temperature of 60° C. The pH of the treated mixture is maintained at pH 2 for an additional 3.25 hours by addition of small increments of concentrated sulfuric acid. During this 3.25 hour period, the temperature of the treated mixture is also maintained at 60° C. After cooling, the treated effluent, containing an oily residue, is extracted with toluene. The organic phase is separated from the aqueous phase and the toluene removed in vacuo to yield 124.6 g of oily residue.

Analysis of the aqueous effluent before and after treatment thereof by the process of the invention for the Biological Oxygen Demand (BOD), Total Organic Carbon (TOC) and Chemical Oxygen Demand (COD), are conducted using the methods described in the 14th Edition of Standard Methods for Examination of water and waste water—published by APHA (American Public Health Association), AWWA (American Water Workers Association) and WPCF (Water Pollution Control Feed), 1975.

| Effluent | BOD (mg/l) | TOC (mg/l) | COD (mg/l) |
|---|---|---|---|
| Prior to treatment | 41,040 | 22,200 | 134,000 |
| After treatment | 15,000 | 16,400 | 64,960 |

EXAMPLE 2

Malathion wash effluent (230 ml) is charged to a round bottom flask and acidified to ph 2 with concentrated sulfuric acid. The acidified mixture is heated to 60° C. and treated with 11.5 ml of 30% hydrogen peroxide, added over a 30 minute period. The treated mixture is held an additional 2 hour period while maintaining the temperature thereof at 60° C. and the pH at 2. The treated mixture is then cooled and extracted with toluene to separate the residue which has formed during treatment, from the aqueous phase. The toluene is removed in vacuo to yield 5.42 g of organic oil.

EXAMPLE 3

Malathion wash water (500 ml) is charged to a 1 liter flask and acidified to pH 2 with concentrated hydrochloric acid. The acidified mixture is then heated to 60° C. and 25 ml of 30% hydrogen peroxide added over a 30 minute period. The reaction mixture is maintained at pH 2 adding additional hydrochloric acid to the treated effluent and the temperature of the reaction mixture is maintained at 60° C. for an additional 3.25 hours. After cooling the treated effluent is extracted with toluene to separate the oily residue which is formed. The toluene is removed in vacuo to yield 20.99 g of oily residue.

Analysis of the aqueous effluent before and after treatment, for Biological Oxygen Demand, Total Organic Carbon and Chemical Oxygen Demand, are determined by the methods of analysis referred to in Example 1 above. Data obtained are as follows:

| Effluent | BOD (mg/l) | TOC (mg/l) | COD (mg/l) |
|---|---|---|---|
| Before treatment | 16,050 | 16,300 | 96,000 |
| After treatment | 7,806 | 6,700 | 37,320 |

EXAMPLE 4

Malathion aqueous wash effluent (500 ml) is charged to a 1 liter flask and acidified to pH 2 with concentrated hydrochloric acid. The acidified effluent is then heated to 60° C. and treated with ozone administered through a sparger tube. Ozone is delivered to the sparger tube from an ozone generator set to deliver a gas stream containing 2% to 4% ozone at 2200 cc/min. No exotherm is noted, but the aqueous effluent becomes cloudy. The pH increases and additional hydrochloric acid is added to maintain the pH at about 2. The effluent becomes clear and a small amount of oil separates. A great deal of fuming, acidic gas ($SO_2$) is generated. After 4.0 hours, the reaction mixture is cooled and ozone addition is halted. No oily residue is visible in the effluent; and extraction of said treated effluent yields only a trace of oily residue, whereas, the treatments of Examples 3 and 6 yield about 21 g and 25 g of oily residue, respectively. Approximately 0.96 to 1.92 moles of ozone per liter of effluent are used in the above treatment.

EXAMPLE 5

Aqueous malathion effluent (500 ml) is charged to a 1 liter flask and acidified to pH 2 with concentrated hydrochloric acid. The mixture is heated to 60° C. and then treated with chlorine gas administered through a sparging tube, 0.302 moles of $Cl_2$ per liter of effluent. The effluent becomes more acidic with the addition of chlorine gas and 50% sodium hydroxide is added to maintain the pH at 2. The mixture is cooled and stirred for 30 minutes and then extracted with toluene. Evaporation of the toluene in vacuo yields only 5.29 g of an oily residue; whereas, the treatments of the invention shown in Examples 3 and 6, yield 21 g and 25 g, respectively, of the oily residue.

EXAMPLE 6

Aqueous malathion effluent (500 ml) is charged to a 1 liter flask and acidified to pH 2 with concentrated hydrochloric acid. The mixture is cooled to 20° C. and treated with 0.23 mole 30% hydrogen peroxide over a 15 minute period. The temperature of the mixture does not rise, however, a white precipitate is formed in the treated mixture. The mixture is stirred for 4 hours and at the end of this period, the mixture is filtered. The aqueous phase is extracted with toluene and the toluene is then evaporated in vacuo. The combined solids from this treatment weigh 25.39 g.

Analysis of the effluent before and after treatment for Biological Oxygen Demand, Total Organic Carbon and Chemical Oxygen Demand, are as follows:

| Effluent | BOD (mg/l) | TOC (mg/l) | COD (mg/l) |
| --- | --- | --- | --- |
| Before treatment | 16,050 | 16,300 | 96,000 |
| After treatment | 9,518 | 10,550 | 58,030 |

EXAMPLE 7

Aqueous malathion effluent (500 ml) is charged to a 1 liter flask and acidified to pH 2 with concentrated hydrochloric acid. The acidified mixture is heated to 60° C. and treated with 0.46 mole of 30% hydrogen peroxide ($2 \times H_2O_2$) over a one hour period. An exotherm occurs and insoluble disulfide precipitates in the mixture and is separated therefrom. The mixture is then extracted with toluene and the toluene then evaporated to give 20.51 g of oily residue. The remaining effluent is analized for Biological Oxygen Demand, Total Organic Carbon and Chemical Oxygen Demand. Data obtained are reported below.

The above treatment is repeated excepting that the heated acidified effluent is treated with excess chlorine gas. The reaction is very exothermic and constant adjustment of the pH with 50% caustic is required to maintain the pH of the mixture at pH 2. The residue from this treatment is separated from the effluent as described above and the remaining effluent analized for BOD, TOC and COD. The data obtained are also reported below. The treatment is again repeated but the heated acidified effluent is treated with ozone, the addition of which causes excessive fuming gas to be liberated from the reaction mixture. Ozone treatment is with oxygen containing 2% to 4% ozone delivered at 2200 cc/min. Again, liberation of copious amounts of fuming gas is noted. The treated effluent is extracted in the same manner as described above and the resulting effluent analyzed for BOD, TOC and COD. Data botained are reported below.

| Effluent Treatment | BOD (mg/l) | TOC (mg/l) | COD (mg/l) |
| --- | --- | --- | --- |
| Untreated | 16,050 | 16,300 | 96,000 |
| Excess $Cl_2$ | 9,750 | 6,000 | 39,690 |
| Ozone | 7,500 | 10,300 | 30,770 |
| $H_2O_2$ | 4,109 | 7,900 | 31,870 |

EXAMPLE 8

Aqueous malathion effluent (500 ml) is charged to a 1 liter flask and basified to pH 12 with 50% caustic. The mixture is then heated to 60° C. and treated with 30% hydrogen peroxide. The temperature and pH of the mixture is maintained for 4 hours at the levels described above. The mixture is then cooled and extracted with toluene as described in the previous examples. In a like manner, the treatment is run at pH 2. The effluents are then analyzed for BOD, TOC and COD. The data obtained are as follows:

| Effluent treatment | BOD (mg/l) | TOC (mg/l) | COD (mg/l) |
| --- | --- | --- | --- |
| pH 12 | 14,700 | 16,865 | 113,660 |
| pH 2 | 10,271 | 10,550 | 51,320 |

The above treatment is repeated excepting that the aqueous malathion effluent is neutralized to pH 7 then heated with 30% hydrogen peroxide, cooled and then extracted with toluene. Only 0.15 g of residue is separated from the effluent.

EXAMPLE 9

Aqueous malathion effluent (400 ml) is charged to a 1 liter flask and acidified with concentrated sulfuric acid to pH 2. The mixture is heated to 60° C. and treated with 8 ml of 30% hydrogen peroxide. This peroxide treatment gives a positive test with starch-potassium iodide paper. The pH and temperature of the mixture are held constant for 2 hours. The oily residue is then separated from the hot reaction mixture. Toluene extraction is not employed since separation of the organic oils from the aqueous phase is a simple separation. The remaining effluent is analyzed for total carbon and the results reported below. Also, the treatment is repeated in all respects except that $0.5 \times (4$ ml) of hydrogen peroxide is use; and again repeated with $2 \times (16$ ml) of hydrogen peroxide. The total organic carbon is determined for the treated effluent in all treatments.

| Effluent treatment | TOC (mg/l) |
| --- | --- |
| Untreated | 7,550 |
| 4 ml $H_2O_2$ | 6,100 |
| 8 ml $H_2O_2$ | 4,400 |
| 16 ml $H_2O_2$ | 4,700 |

EXAMPLE 10

Aqueous malathion effluent (400 ml) is charged to a 1 liter flask and acidified to pH 2 with concentrated sulfuric acid. The acidified mixture is then heated to 80° C. and treated with 20 ml of 30% hydrogen peroxide. The temperature and pH of the mixture is held constant for 2 hours. The oily residue is separated from the hot aqueous effluent without difficulty. It is found that solids do not form in the treated effluent. The effluent is adjusted to pH 7 with caustic and sent out for analysis.

We claim:

1. A method for deodorizing and removing organic chemicals from malodorous aqueous effluent derived from the manufacture of an organic thiophosphate or dithiophosphate, which effluent contains sulfur and organic chemical by-products comprising the step of: adjusting the pH of said aqueous effluent to between pH 1 and pH 4, heating said acidified effluent to between 20° C. and 85° C., treating said heated effluent with sufficient hydrogen peroxide to obtain a positive response to a starch-potassium iodide paper and separating from said effluent the oily residue which forms therein.

2. A method according to claim 1, wherein said malodorous aqueous effluent is derived from the manufacture of malathion.

3. A method according to claim 1, wherein said malodorous effluent is adjusted to pH 1 to pH 4 with sulfuric acid or hydrochloric acid, the acidified effluent is heated to a temperature between 75° C. and 85° C. and the hydrogen peroxide has a concentration of from 30% to 50%.

4. A method for deodorizing and removing water soluble organic by-products and water soluble starting materials from aqueous effluent obtained in the manufacture of malathion comprising adjusting the pH of said effluent to about pH 2 with sulfuric acid or hydrochloric acid, heating said acidified effluent to about 80° C., treating said heated effluent with a sufficient amount of 50% hydrogen peroxide to obtain a positive response to starch-potassium iodide paper from said treated effluent and separating from said aqueous effluent any residue and/or precipitate that forms in said effluent during treatment.

* * * * *

UNITED STATES PATENT AND TRADEMARK OFFICE
CERTIFICATE OF CORRECTION

PATENT NO. : 4,263,136
DATED : April 21, 1981
INVENTOR(S) : George N. Gagliardi et al.

It is certified that error appears in the above—identified patent and that said Letters Patent is hereby corrected as shown below:

On The Title Page Insert:

-- (73) Assignee: American Cyanamid Company, Stamford, Conn. --.

Signed and Sealed this

Tenth Day of November 1981

[SEAL]

Attest:

GERALD J. MOSSINGHOFF

Attesting Officer    Commissioner of Patents and Trademarks